3,551,332
PURIFICATION OF FLUORINE-CONTAINING
INDUSTRIAL WASTE WATERS
Arthur N. Baumann and Richard E. Bird, Lakeland, Fla.,
assignors to International Minerals & Chemical Corporation, a corporation of New York
Filed June 16, 1969, Ser. No. 833,556
Int. Cl. C02c 5/02
U.S. Cl. 210—53                                                17 Claims

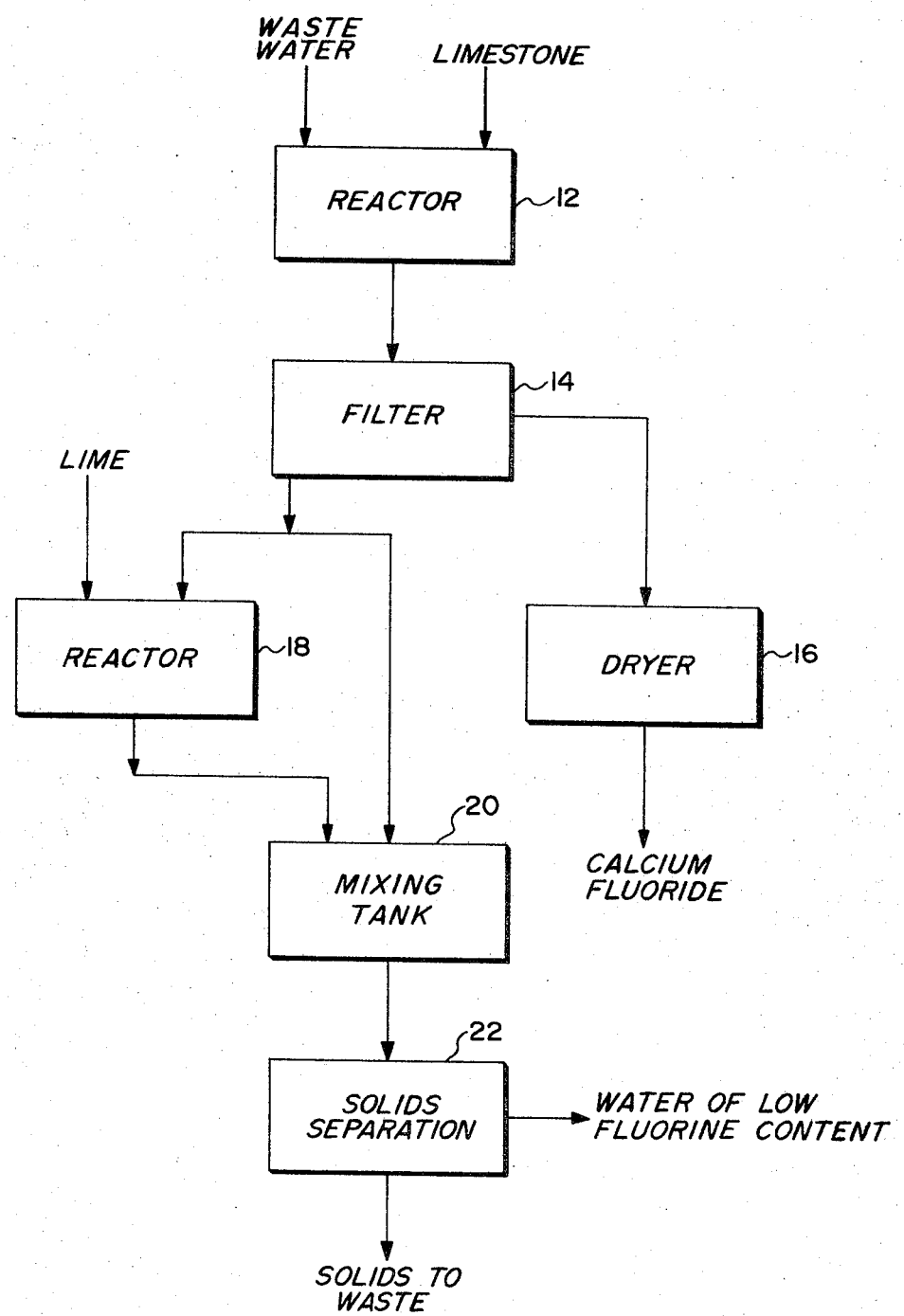

ABSTRACT OF THE DISCLOSURE

Fluorine values are removed from an aqueous fluosilicic acid solution by adding limestone to precipitate calcium fluoride, separating the calcium fluoride by filtration or otherwise, adding lime to a portion of the filtrate to form a slurry, combining the slurry with the remaining portion of the filtrate, allowing solids to form and settle, and removing the settled solids. In a preferred embodiment of this invention, the amount of fluorine removed from aqueous phosphorus contaminated fluorine-containing acid is improved by adding lime after the limestone addition but prior to the calcium fluoride separation step.

BACKGROUND OF THE INVENTION

Large quantities of waste waters from many industrial operations contain fluorine in combined form and, therefore, present a serious disposal problem. Plants for the manufacture of wet process phosphoric acid and/or superphosphate fertilizers by the acidulation of phosphate rock are examples of industrial operations that produce large quantities of fluorine-containing waste streams. The fluorine is originally present, along with other impurities, in commercially exploited phosphate deposits.

Gases containing a part of the fluorine content of the phosphate rock are evolved during the acidulation of phosphate rock in the manufacture of the wet process phosphoric acid and superphosphates. These gases contain fluorine in the form of hydrogen fluoride and/or silicon tetrafluoride. In order to minimize air pollution, it is important that the fluorine content of these gases be removed before they are discharged to the atmosphere. This is usually accomplished by scrubbing the by-product gases to wash out the fluorine and other water-soluble constituents. Such absorber treatments produce dilute solutions of fluosilicic acid, which are usually impounded in large ponds.

Another source of these so-called "pond waters" is the water which was used for hydraulically transporting gypsum obtained as a by-product from the manufacture of phosphoric acid by the wet process. These ponds also normally contain the waste gypsum which contains soluble and insoluble impurities. The water thus becomes contaminated by the cations and anions contained in the gypsum. The amount of gypsum and its impurities that is soluble increases as the pH of the pond water decreases.

The disposal of these fluorine-containing solutions presents a pollution problem, especially in those areas in which the discharge of water-soluble fluorine compounds is strictly regulated. As for example, the state of Florida, which is one of the world's largest wet process phosphoric acid and superphosphate producing areas, requires that all waters discharged to streams, rivers, lakes and surrounding watersheds contain a maximum of only 10 parts per million (p.p.m.) of fluorine. The recovery of fluorine values from these waste streams is also economically desirable in view of the increasing use of fluorine in a large variety of industrial processes and products.

A number of processes have been proposed for removing fluorine values from dilute aqueous solutions of fluosilicic acid, such as the hereinbefore described waste streams from phosphoric acid and fertilizer plants. These processes generally utilize calcium carbonate and/or lime to precipitate the fluorine from the solutions in the form of calcium fluoride. As illustrative of such processes, U.S. Pat. No. 2,780,521, issued to Butt, discloses a process wherein the fluosilicic acid solution, while a temperature of 35° to 130° F., is reacted with ground limestone in an amount sufficient to produce a pH between 3.5 and 6.7. Calcium sulfate is utilized in combination with the calcium carbonate in the process of U.S. Pat. No. 2,914,474 of Hillyer and Wilson. Gloss discloses still another process in U.S. Pat. No. 2,780,523, wherein the fluosilicic acid solution is reacted in two stages with the calcium carbonate. Another process that has been commercially utilized is the sequential addition of limestone and lime to the waste water.

The above processes and other similar processes which have been suggested suffer from the disadvantage that it is often difficult, or even impossible, to reduce the fluorine content of some waste streams to a maximum of 10 parts per million. As for example, Hillyer et al. disclose that their process may be utilized for reducing the fluorine content of the waste waters to about 8 to 20 p.p.m. They add that the reduction of the fluorine content to below about 8 p.p.m. is impractical at normal atmospheric temperature since the slight solubility of calcium fluoride will cause about that quantity of fluorine to be dissolved. This is confirmed by the theoretical solubility for calcium fluoride, such as found in Seidell's "Solubilities of Inorganic and Metal Organic Compounds," published by th American Chemical Society in 1965, which gives a fluorine concentration range in pure water of from 8 to 20 p.p.m. In actual practice, however, fluorine concentrations below about 10 p.p.m. are seldom reached due to the presence of other soluble components in the waste waters and the slower crystallization kinetics at the relatively low temperatures utilized during the fluorine removal processes.

SUMMARY OF THE INVENTION

This invention is based on the discovery that the fluorine content of the waste water can be reduced to a value below that which could heretofore be regularly obtained by changing the procedure for the addition of the basic reactants to the waste water. The aforementioned limitations on the quantity of fluorine removed are overcome in accordance with this invention by adding lime to only a portion of the limestone-treated waste water.

Briefly, the process of this invention is one for removing fluorine values from a fluosilicic acid-containing aqueous solution which has a pH of less than about 3.0. The process comprises first adding finely divided calcium carbonate, e.g., limestone, to the aqueous solution in an amount sufficient to produce a pH of from about 3.0 to about 3.3 and precipitate calcium fluoride, and separating the precipitated calcium fluoride by filtration or otherwise. Lime is added to the filtrate obtained from the previous calcium fluoride separation step in an amount sufficient to produce a slurry having a pH greater than 7.0, preferably from about 11.0 to about 12.0. The slurry thus formed is then combined with a quantity of an aqueous solution of the same general characteristics as the solution to which the lime was added, i.e., one obtained by utilizing the aforementioned calcium carbonate treatment for separating calcium fluoride from a starting solution of the above description. The slurry is combined with a sufficient amount of the calcium carbonate-treated aqueous solution to produce a combined liquid having a pH of from about 5.5 to about 7.0, preferably from about 6.0 to about 6.5. The combined liquid is then allowed to stand to permit solids to settle, and the solids are removed by filtration or otherwise.

The aqueous solution to which the lime is added after the calcium fluoride precipitation step to form a slurry and the aqueous solution which is combined with the slurry to form the combined liquid may be separate portions of the same aqueous solution. This embdiment comprises removing from about 10 to about 50% by volume of the filtrate from the calcium fluoride precipitation step, adding lime to the remaining volume of the filtrate in an amount sufficient to produce a slurry having a pH greater than 7.0, and then combining the slurry with the previously removed volume of aqueous solution to provide a combined liquid having a pH of from about 5.7 to about 7.0.

It has also been discovered that the amount of calcium fluoride precipitated from the waste water is enhanced by adding soluble phosphate and/or sulfate values to the waste water prior to the addition of the limestone.

It has still further been dscovered that the quantity of fluorine removed from a phosphorus-contaminated solution may be increased sufficiently so as to yield a clarified aqueous solution having a fluorine content of less than 8 p.p.m. by adding lime to the waste stream subsequent to the limestone addition but prior to the calcium fluoride separation step. The lime is added to the limestone-treated solution in an amount sufficient to raise the pH thereof to the range of from about 3.5 to about 4.0, preferably from about 3.6 to about 3.8.

DESCRIPTION OF THE PREFERRED EMBODIMENTS

The process of this invention is useful for recovering fluorine values from an aqueous solution having a pH of less than 3.0 and containing combined fluorine, a substantial portion of which is in the form of fluosilicic acid, i.e., $H_2SiF_6$. Superphosphate and wet process phosphoric acid manufacturing plants are sources of such fluorine-containing waste waters. These plants produce waste streams having a fluosilicic acid concentration of from about 0.25 to about 1.5% from which the fluorine can be removed in accordance with this invention. Waste streams having a greater fluosilicic acid concentration, as for example, up to about 10% $H_2SiF_6$ or even higher, may similarly be treated in accordance with this invention.

The fluosilicic acid-containing aqueous solution, such as obtained by scrubbing the by-product gases from the manufacture of phosphoric acid or superphosphate, may be initially treated to remove precipitated solids and silica as by filtering, settling and decanting, or equivalent solids-separation operation.

The dilute fluosilicic acid solution is mixed with finely-divided calcium carbonate in an amount sufficient to raise the pH of the solution to the preferred range of from about 3.0 to about 3.3, more preferably to the range of from about 3.1 to about 3.2. The calcium carbonate may be used in an amount to raise the pH to a value above 3.3, e.g., to 3.6. However, this would require an excess of calcium carbonate in view of the buffering action of the soluble impurities, such as phosphates and sulfates, which are normally found in such waste waters. The presence of these impurities make the use of a mixed reagent system highly advantageous at this point in the process. This reaction is most effectively carried out by using limestone ground to about 90% minus 80 mesh, preferably minus 100 mesh. The calcium carbonate may be added at one time or incrementally. A reaction temperature of from about 35° to about 130° F. or even higher can be used, but temperatures in the range of from about 60° to about 90° F. are preferred. The time of addition of the calcium carbonate plus holding time will generally vary from about 15 to about 60 minutes, or longer.

The calcium carbonate thus added reacts with a substantial portion of the fluosilicic acid content of the aqueous solution to cause the precipitation of calcium fluoride and other material. The impure calcium fluoride solids are removed from the aqueous solution by filtration or other suitable separation means to yield a filtrate which is additionally treated as described below to further reduce the fluorine content thereof. The solids obtained from the reaction of the aqueous solution with the calcium carbonate is an impure calcium fluoride product typically containing, as for example, from about 38 to about 50% CaO, from about 15 to about 25% fluorine, from about 8 to about 15% $P_2O_5$, and from about 0.1 to about 0.3% $SiO_2$. This product may be treated by any suitable method to reduce the content of materials other than calcium fluoride to obtain a substantially pure calcium fluoride product.

Lime is added to the filtrate remaining after the calcium fluoride separation step in an amount sufficient to produce a slurry having a pH greater than 7, preferably from about 11 to about 12. Quick lime or hydrated lime may be used in the process. The temperature maintained for this stage of the treatment will be approximately the same as utilized during calcium carbonate treatment, namely, a temperature of from about 35° to about 130 F. being generally useful, with a temperature of from about 60° to about 90° F. being preferred The overall reaction time for this stage will also be the same as that utilized during the first stage, namely, generally between 15 minutes and one hour.

The slurry formed by the addition of the lime is combined with a quantity of an aqueous solution of the same general characteristics as the solution to which lime was added, namely, a solution obtained by adding calcium carbonate in the above amounts to a waste stream which is a dilute fluosilicic acid solution having a pH less than 3 to precipitate calcium fluoride therefrom, and then removing the calcium fluoride. The slurry and the aqueous solution are combined in amounts to produce a combined liquid having a pH of from about 5.5 to about 7, preferably from about 6.0 to about 6.5.

It will be evident to those skilled in the art that the aqueous solution to which the lime is added after the calcium fluoride precipitation step and the aqueous solution which is combined with the slurry may be separate portions of the same aqueous solution which is combined with the slurry may be separate portions of the same aqueous solution. In this embodiment from about 10 to about 50% by volume, preferably from about 20 to 30% by volume, of the filtrate remaining after the calcium fluoride separation step is separated from the remaining volume of the filtrate, and lime is added to the remaining volume of the filtrate in an amount to produce a slurry having a pH over 7.0. The slurry is formed by the addition of the lime to a portion of the filtrate is then combined with the previously removed portion of the filtrate.

The combined liquid which is formed by the combination of the lime-treated filtrate with untreated filtrate is then allowed to stand so as to permit the settling of solids, which are principally a complex mixture of calcium fluoride salts. The settled solids are finally removed by filtration or otherwise to yield a clarified solution of substantially reduced fluorine content. The fluorine content of the clarified solution will naturally vary depending upon factors such as the treating conditions utilized and the fluorine content of the waste water, but clarified solutions having a fluorine content as low as about 13 p.p.m. may be obtained by utilization of the above-described process.

An improvement in the settling and filtration rates of the calcium fluoride is obtained when the waste waters contain at least 0.25% by weight of at least one soluble phosphate and/or sulfate compound. These compounds are most beneficially present in the total amount of from about 0.25 to about 1.0% by weight of the fluorine-containing solution, calculated on $P_2O_5$ and $SO_3$ weight bases. Greater quantities of such compounds may be present but with only little, if any, additional advantage. The pond waters from fertilizer and wet process plants which are hereinbefore described generally are so contaminated. In the event that waste water to be treated in accordance with this invention does not contain any soluble phosphate or sulfate compound, such compounds may be added prior to the addition of the limestone. Specific examples of soluble compounds which may be added to the waste water include soluble sulfate compounds such as calcium sulfate, sulfuric acid, or an alkali metal sulfate, e.g., sodium sulfate, and soluble phosphate compounds such as phosphoric acid, dicalcium phoshate, or an alkali metal phosphate, e.g., trisodium phosphate.

In the event fluorine is to be removed from a phosphorous-contaminated waste water in accordance with this invention, the quantity of fluorine removed may be enhanced by the utilization of an additional treatment or neutralization reaction intermediate the addition of the limestone and the calcium fluoride separation step. Effective phosphorus contents are at least about 0.08 to about 0.1% $P_2O_5$ by weight, usually in the form of phosphate ion. The water may contain a greater phosphorus content than 0.1% but there will be no additional improvement in the quantity of fluorine removed. In this embodiment, the limestone-treated aqueous solution, having a pH within the range of from about 3.0 to about 3.3 is treated with either quick lime or hydrated lime prior to the calcium fluoride separation step. The lime is added to the limestone-treated solution in an amount sufficient to produce a stream having a pH in the range of from about 3.5 to about 4.0, preferably from about 3.6 to about 3.8. Temperatures and holding times are substantially the same as utilized in the limestone treatment. This additional lime treatment is effective to reduce the fluorine content of the clarified waste stream at a pH of 5.5 to 7.0 to below about 4 p.p.m. Water having this low of a fluorine content may be discharged into reservoirs, streams, and the like, without fear of polluting the same.

This invention might be best understood by reference to the accompanying drawing, which is a schematic flow sheet of an embodiment of this invention. Waste water, such as the pond water from a superphosphate and wet process phosphoric acid manufacturing plant, is introduced into a first reactor 12 where it is mixed with a charge of limestone. The limestone is added in an amount sufficient to raise the pH of the waste water from below 3.0 to 3.2. The limestone-treated waste water is maintained in reactor 12 for a period of about 30 minutes to allow the reaction of the limestone with the fluosilicic acid content of the waste water to go to completion and precipitate calcium fluoride. The limestone-treated waste water is fed to filter 14 where a calcium fluoride filter cake is separated. The calcium fluoride filter cake is conveyed by suitable means from filter 14 to dryer 16. The dried calcium fluoride filter cake obtained from dryer 16 may then be treated by any suitable method so as to remove some of the contaminants therefrom and improve the purity of the calcium fluoride.

A portion of the filtrate, i.e., about 20%, from filter 14 is passed to a second reactor 18 where it is mixed with sufficient lime to raise the pH thereof to 11.00. About 30 minutes are allowed for the lime to react with the portion of the filtrate and form a slurry. The slurry is then introduced into the mixing tank 20, where it is combined and thoroughly mixed with the remaining 80% of the filtrate from filter 14. The combined liquid is maintained in tank 20 for 30 minutes. The combined liquid is finally introduced into solids separation section 22, where water having a substantially reduced fluorine content is separated from the solids content thereof such as by filtration. The water is either discharged, or recycled to the plant and reused. The solids obtained from separation section 22, whch are primarily a complex mixture of calcium fluoride salts, are discharged as waste.

The following examples are given by way of further explanation and without any intention of limiting the invention thereof.

EXAMPLE I

This experiment utilized so-called pond water obtained from a superphosphate and wet process phosphoric acid manufacturing plant. Pond water from such a plant has the following typical composition, in parts per million:

| | |
|---|---|
| $P_2O_5$ | 8,500 |
| F | 7,100 |
| CaO | 3,000 |
| $SiO_2$ | 3,000 |
| $SO_3$ | 2,000 |

Limestone which was crushed to a size of about 90% minus 100 mesh was added to the pond water at the rate of about 9 pounds per 100 gallons so as to raise the pH to about 3.2. Approximately 30 minutes were allowed to permit the reaction to go to completion and the solids were removed from the limestone-treated water by settling and filtration. About 40% of the filtrate was then treated with hydrated lime at the rate of about 30 pounds per 100 gallons so as to produce a slurry having a pH of about 11. Thirty minutes after the lime addition, the slurry formed was combined with the remaining 60% of the filtrate to form a combined solution which was allowed to stand for about 30 minutes before the solids were removed by filtration. The water obtained from this final solids-separation step had a fluorine content of 13.4 parts per million.

EXAMPLE II

This experiment was conducted to demonstrate the substantial improvement obtained by adding the lime to only a portion of the filtrate obtained from the calcium fluoride separation step. The procedure of Example I is followed, except that the lime is added to all of the filtrate from the calcium fluoride separation step in an amount sufficient to raise the pH thereof to 7.0. This change eliminated the feature of the procedure of the experiment of Example I of adding the lime to only a portion of the calcium fluoride filtrate and then combining it with the remainder of the filtrate. The water obtained from the final solid separation step in this experiment contained about 15 parts per million of fluorine. Therefore, the feature of adding the lime to only a portion of the calcium fluoride filtrate resulted in a reduction of the fluorine content from the 15.0 p.p.m. of this experiment to the lower level of 13.4 p.p.m. of Example I.

EXAMPLE III

This example illustrates the embodiment of the present invention wherein a lime treatment is utilized intermediate the limestone treatment and the calcium fluoride separation step. The procedure of Example I is again followed, except hydrated lime is added to the limstone-treated waste water in an amount to raise the pH thereof to about 3.6. The lime-treated waste water is then filtered to separate the calcium fluoride therefrom after allowing about 60 minutes for the neutralization reaction with the lime to take place. The water obtained from the final solids-separation step had a fluorine content of 3.3 parts per million.

Therefore, the decided advantage in utilizing the additional lime treatment step is readily noted.

Although this invention has been described in relation to specific embodiments, it will be obvious that certain modifications may be made by one skilled in the art without departing from the scope thereof as defined by the appended claims.

We claim:
1. A process for removing fluorine values from an aqueous solution having a pH of less than 3 and contain- ing combined fluorine, a substantial portion of which is in the form of fluosilicic acid, which comprises:
  (a) Adding calcium carbonate to said aqueous solution in an amount sufficient to produce a pH of from about 3.0 to about 3.6 and precipitate calcium fluoride,
  (b) Separating said precipitated calcium fluoride from said aqueous solution to yield a first solids-free aqueous solution,
  (c) Adding lime to said first solids-free aqueous solution in an amount sufficient to produce a slurrry having a pH greater than 7.0,
  (d) Combining said slurry with a second solids-free aqueous solution in an amount sufficient to produce a combined liquid having a pH of from about 5.5 to about 7.0, said second solids-free aqueous solution having been prepared by treating an aqueous solution having a pH of less than 3.0 and containing combined fluorine, a substantial portion of which is in the form of fluosilicic acid, by adding calcium carbonate thereto in an amount sufficient to produce a pH of from about 3.0 to about 3.6 and precipitate calcium fluoride, and separating said precipitated calcium fluoride,
  (e) Allowing solids to settle in said combined liquid, and
  (f) Removing settled solids from said combined liquid to yield an aqueous solution of substantially reduced fluorine content.

2. A process in accordance with claim 1 wherein calcium carbonate is added to said fluorine-containing solutions in amounts sufficient to produce pH's of from about 3.0 to about 3.3.

3. A process in accordance with claim 2 wherein said fluorine-containing aqueous solutions are the same solution to which said calcium carbonate is added to raise the pH thereof and to precipitate calcium fluoride, and said calcium fluoride is separated to yield a clear liquid which is divided into said first solids-free aqueous solution containing from about 10 to about 50% by volume of said clear liquid and said second solids-free aqueous solution containing from about 50 to about 90% by volume of said clear liquid.

4. A process in accordance with claim 3 wherein said calcium carbonate is 90% minus 80 mesh limestone.

5. A process in accordance with claim 4 wherein lime is added to said first solids-free aqueous solution in an amount sufficient to produce a slurry having a pH of from about 11 to about 12.

6. A process in accordance with claim 5 wherein said slurry and second solids-free aqueous solution are combined in amounts to produce a liquid having a pH of from about 6.0 to about 6.5.

7. A process in accordance with claim 6 wherein said limestone is added to said fluorine-containing solution in an amount sufficient to produce a pH of from about 3.1 to about 3.2.

8. A process in accordance with claim 7 wherein said fluorine-containing aqueous solution is contaminated with at least about 0.08% phosphate calculated on a $P_2O_5$ weight basis, and lime is added to the limestone-treated aqueous solution prior to the calcium fluoride separation step in an amount sufficient to raise the pH thereof to the range of from about 3.5 to about 4.0.

9. A process in accordance with claim 8 wherein lime is added to the limestone-treated aqueous solution prior to the calcium fluoride separation step in an amount sufficient to raise the pH thereof to the range of from about 3.6 to about 3.8.

10. A process in accordance with claim 9 wherein said fluorine-containing aqueous solutions are the same solution to which said calcium carbonate is added to raise the pH thereof and to precipitate calcium fluoride, and said calcium flouride is separated to yield a clear liquid which is divided into said first solids-free aqueous solution containing from about 20 to about 30% by volume of said clear liquid and said second solids-free aqueous solution containing from about 70 to about 80% by volume of said clear liquid.

11. A process in accordance with claim 10 wherein a reaction temperature of from about 35° to about 130° F. is maintain after said limestone is added to said fluorine-containing aqueous solution.

12. A process in accordance with claim 11 wherein a reaction temperature of from about 60° to about 90° F. is maintained after said limestone is added to said fluorine-containing aqueous solution.

13. A process in accordance with claim 12 wherein a reaction temperature of from about 35° to about 130° F. is maintained after lime is added to said solids-free aqueous solution in an amount sufficient to produce said slurry.

14. A process in accordance with claim 3 wherein said fluorine-containing aqueous solution is contaminated with at least about 0.08% phosphate calculated on a $P_2O_5$ weight basis, and lime is added to the calcium carbonate-treated aqueous solution prior to the calcium fluoride separation step in an amount sufficient to raise the pH thereof to the range of from about 3.5 to about 4.0.

15. A process in accordance with claim 14 wherein lime is added to the calcium carbonate-treated aqueous solution prior to the calcium flouride separation step in an amount sufficient to raise the pH thereof to the range of from about 3.6 to about 3.8.

16. A process in accordance with claim 15 wherein at least one water-soluble phosphate or sulphate is added to said fluorine-containing aqueous solution prior to the addition of said limestone.

17. A process in accordance with claim 16 wherein at least one water-soluble phosphate or sulphate is added to said fluorine-containing aqueous solution in the amount of from about 0.25 to about 1.0% by weight.

References Cited
UNITED STATES PATENTS

| | | | |
|---|---|---|---|
| 785,312 | 3/1905 | Langley | 210—50 |
| 789,671 | 5/1905 | Reich | 23—88 |
| 2,780,521 | 2/1957 | Butt | 23—88 |
| 2,780,523 | 2/1957 | Gloss | 23—88 |
| 2,914,474 | 11/1959 | Hillyer et al. | 210—53 |

MICHAEL ROGERS, Primary Examiner

U.S. Cl. X.R.

23—88